United States Patent
Suzuki et al.

(10) Patent No.: US 6,234,928 B1
(45) Date of Patent: May 22, 2001

(54) RATCHET TENSIONER

(75) Inventors: Tadasu Suzuki, Higashimurayama; Kazuhiko Shimaya, Hidaka, both of (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/373,946

(22) Filed: Aug. 13, 1999

(30) Foreign Application Priority Data

Aug. 20, 1998 (JP) .................................. 10-234640

(51) Int. Cl.$^7$ ...................................... F16H 7/08
(52) U.S. Cl. ............................. 474/109; 474/101
(58) Field of Search .................... 474/109, 110, 474/111, 135, 136, 133, 138, 113–117, 101, 140; 242/197, 76; 428/900; 430/65, 66, 67

(56) References Cited

U.S. PATENT DOCUMENTS

| | | | |
|---|---|---|---|
| 4,635,877 | * 1/1987 | Oishi et al. | 242/197 |
| 4,822,320 | * 4/1989 | Suzuki | 474/111 |
| 5,030,169 | * 7/1991 | Kiso et al. | 474/138 X |
| 5,073,150 | * 12/1991 | Shimaya | 474/110 |
| 5,643,117 | 7/1997 | Dembosky . | |
| 5,967,920 | * 10/1999 | Dembosky et al. | 474/111 |
| 5,967,921 | * 10/1999 | Simpson et al. | 474/110 |

FOREIGN PATENT DOCUMENTS

| | | |
|---|---|---|
| 0 908 646 A1 | 4/1999 | (EP) . |
| 2340200 | * 2/2000 | (GB) . |
| 64-31984 | * 2/1989 | (JP) . |
| 2-91813 | * 3/1990 | (JP) . |
| 10141451 | 5/1998 | (JP) . |

* cited by examiner

Primary Examiner—David A. Bucci
Assistant Examiner—Marcus Charles
(74) Attorney, Agent, or Firm—Dann, Dorfman, Herrell and Skillman; Henry H. Skillman

(57) ABSTRACT

The housing of a ratchet tensioner is formed of an aluminum-containing metallic material in order to decrease the weight of the tensioner. A hard alumite layer having a thickness of 5 to 50 μm is formed on the inner circumferential surface of a plunger accommodation bore formed in the housing, and a lubricant is incorporated into the alumite layer. Thus, the service life before occurrence of seizure is increased.

8 Claims, 4 Drawing Sheets

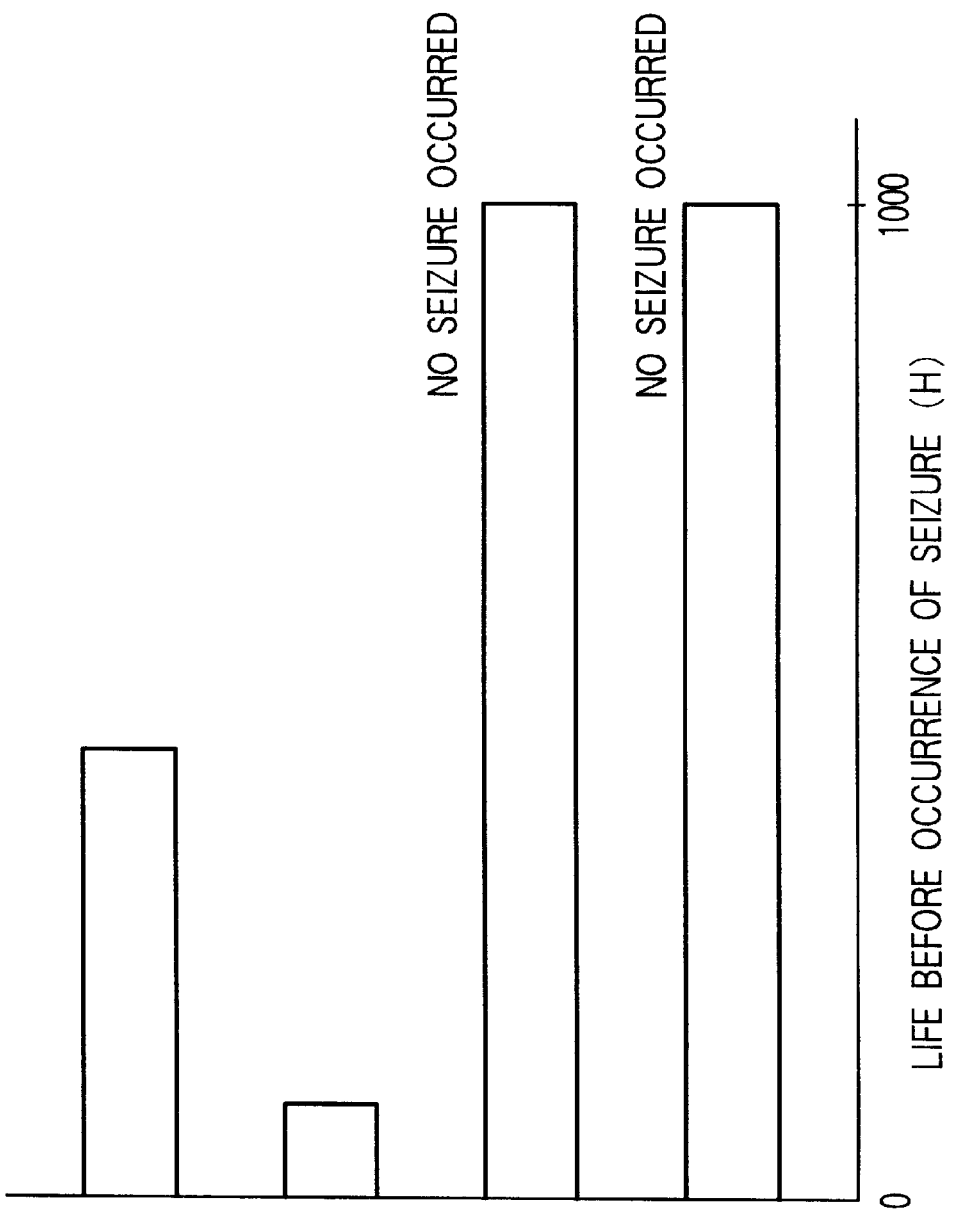

RATCHET TENSIONER

BACKGROUND OF THE INVENTION

1. Field of the Invention

The present invention relates to a ratchet-type tensioner for applying an appropriate tension to a timing chain of a vehicle engine. More particularly, the present invention relates to a ratchet-type tensioner which employs an aluminum tensioner housing formed of aluminum or an aluminum alloy.

2. Description of the Related Art

Conventionally, a timing chain is used in a chain drive for transmitting rotational motion from a crankshaft to a camshaft of an automobile engine, and a ratchet-type tensioner is used for applying tension to the timing chain. That is, the tensioner is adapted to apply an appropriate tension to the slack side of the timing chain to thereby suppress vibration, which would otherwise occur in the timing chain when the chain travels, and to maintain a proper pressing force regardless of elongation of the chain.

The conventional ratchet-type tensioner is mounted on an engine body on the slack side of a chain (timing chain). The chain is fitted around and extends between a driving sprocket rotated by a crankshaft of an engine and a driven sprocket fixed on a camshaft.

The ratchet-type tensioner includes a plunger projecting from the front face of a tensioner housing such that the plunger can undergo reciprocating motion. A tip portion of the plunger presses the rear side of a tension lever at a position near the free end thereof. The tension lever is pivotally supported on the engine body by means of a support shaft. Through such an arrangement, a shoe surface of the tension lever is brought into slidable contact with the slack side of the chain to thereby apply tension to the chain.

The tensioner housing has a plunger accommodation bore into which the plunger is fitted such that the plunger may undergo reciprocating motion. The plunger has a hollow portion opening to an end surface of the plunger which faces the bottom of the plunger accommodation bore. A plunger spring is inserted into the hollow portion and disposed between the bottom of the plunger accommodation bore and that of the hollow portion, thereby urging the plunger at all times in such a direction that the plunger is projected from the tensioner housing.

A ratchet is pivotally supported on the tensioner housing by means of a ratchet pin. The ratchet has ratchet pawls which mesh with rack teeth formed on an outer surface of the plunger.

A ratchet spring is disposed between the tensioner housing and the ratchet and urges the ratchet to rotate about the ratchet pin so that the ratchet pawls are in engagement with the rack teeth at all times. Through engagement between the ratchet pawls and the rack teeth, the plunger is prevented from moving in a receding direction.

In the ratchet-type tensioner having the above-described structure, since the tensioner housing is made of gray cast iron, the ratchet-type tensioner is heavy.

In order to solve this drawback, the present invention employs a tensioner housing formed of an aluminum-containing metallic material such as aluminum or an aluminum alloy. However, mere employment of an aluminum-containing metallic material for the tensioner housing causes the following problem. A stress (load) corresponding to the tension of the chain acts on the plunger. Further, a side force (a force perpendicular to the advancing direction of the plunger) acts on the plunger so that the plunger is pressed against the sliding surface of the plunger accommodation bore. Therefore, when the tensioner housing is formed of an aluminum-containing metallic material, the friction resistance at the sliding surface increases, so that when the plunger reciprocates over a distance of about 0.1 to a few millimeters during rotation of the engine, seizure occurs between the tensioner housing and the plunger, and the strength of the plunger accommodation bore of the tensioner housing is reduced.

SUMMARY OF THE INVENTION

Therefore, a first object of the present invention is to provide a ratchet-type tensioner having a reduced weight.

A second object of the present invention is to provide a ratchet-type tensioner which can prevent seizure which would otherwise occur between the tensioner housing and the plunger.

To achieve the above object, the present invention provides a ratchet-type tensioner in which a plunger is slidably fitted into a plunger accommodation bore formed in a tensioner housing and is urged by a spring such that a tip portion of the plunger is projected to the exterior of the plunger accommodation bore. The ratchet is pivotally supported on a ratchet pin provided on the tensioner housing. A ratchet pawl formed on the ratchet is meshed with rack teeth formed on an outer surface of the plunger so as to prevent the plunger from receding into the plunger accommodation bore. The tensioner housing is formed of an aluminum-containing metallic material, and a hard alumite layer having a thickness of 5 to 50 $\mu$m is formed on the inner circumferential surface of the plunger accommodation bore. The alumite layer contains therein a lubricant such as molybdenum disulfide or fluororesin.

The term "aluminum-containing metallic material" encompasses aluminum and aluminum alloys.

Since the tensioner housing is formed of an aluminum-containing metallic material, the weight of the tensioner can be decreased as compared with conventional tensioners utilizing a tensioner housing formed of gray cast iron. Further, a hard alumite layer having a thickness of 5 to 50 $\mu$m is formed on the inner circumferential surface of the plunger accommodation bore of the tensioner housing, and a lubricant such as molybdenum disulfide or fluororesin is incorporated in the alumite layer. Therefore, the service life before occurrence of seizure can be increased, and the strength of the plunger accommodation bore can be increased.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 4 is a graph showing service life before occurrence of seizure for each of materials used for the tensioner housing.

DESCRIPTION OF THE PREFERRED EMBODIMENTS

An embodiment of the present invention will next be described with reference to the drawings.

Figure 1:
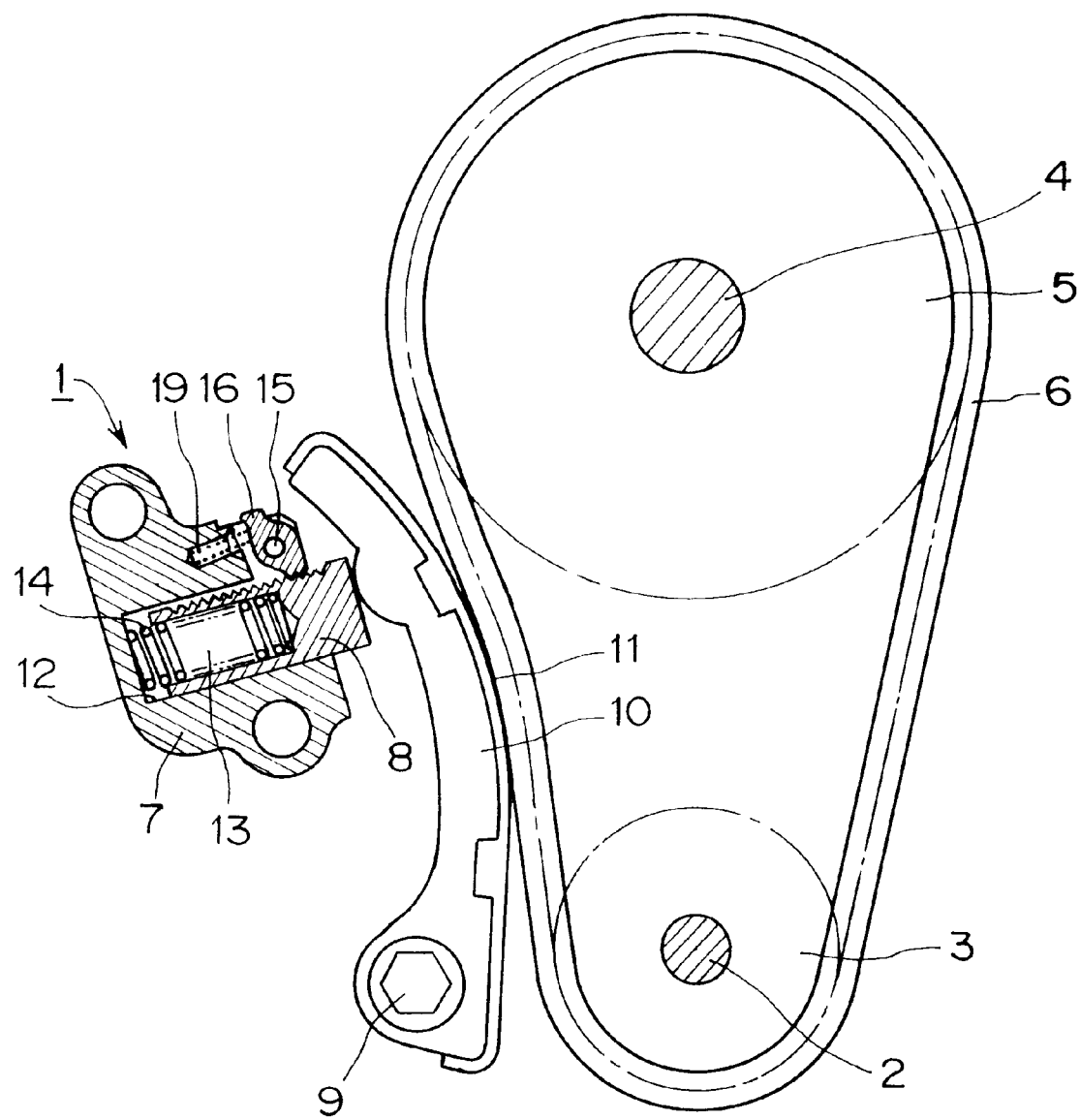
FIG. 1 is a sectional view of a ratchet-type tensioner according to an embodiment of the present invention.

As shown in FIG. 1, a ratchet-type tensioner 1 is mounted on an engine body on the slack side of a chain 6 (timing chain). The chain 6 is fitted around and extends between a driving sprocket 3 rotated by a crankshaft 2 of an engine and a driven sprocket 5 fixed on a camshaft 4.

In the ratchet-type tensioner 1, a plunger 8 projects from the front face of a tensioner housing 7 such that it can undergo reciprocating motion. A tip portion 8A of the plunger 8 presses the rear side of a tension lever 10 at a position near the free end thereof. The tension lever 10 is pivotally supported on the engine body by means of a support shaft 9. Through such an arrangement, a shoe surface 11 of the tension lever 10 is brought into slidable contact with the slack side of the chain 6 to thereby apply tension to the chain 6.

The tensioner housing 7 has a plunger accommodation bore 12 formed therein. The plunger 8 is fitted into the bore 12 such that it may undergo reciprocating motion. The plunger 8 has a hollow portion 13 formed therein. The hollow portion 13 opens to the end surface of the plunger 8 which faces the bottom of the plunger accommodation bore 12. A plunger spring 14 is inserted into the hollow portion 13 and disposed between the bottom of the plunger accommodation bore 12 and that of the hollow portion 13, thereby urging the plunger 8 at all times in such a direction that the plunger 8 is projected from the tensioner housing 7.

Figure 2:
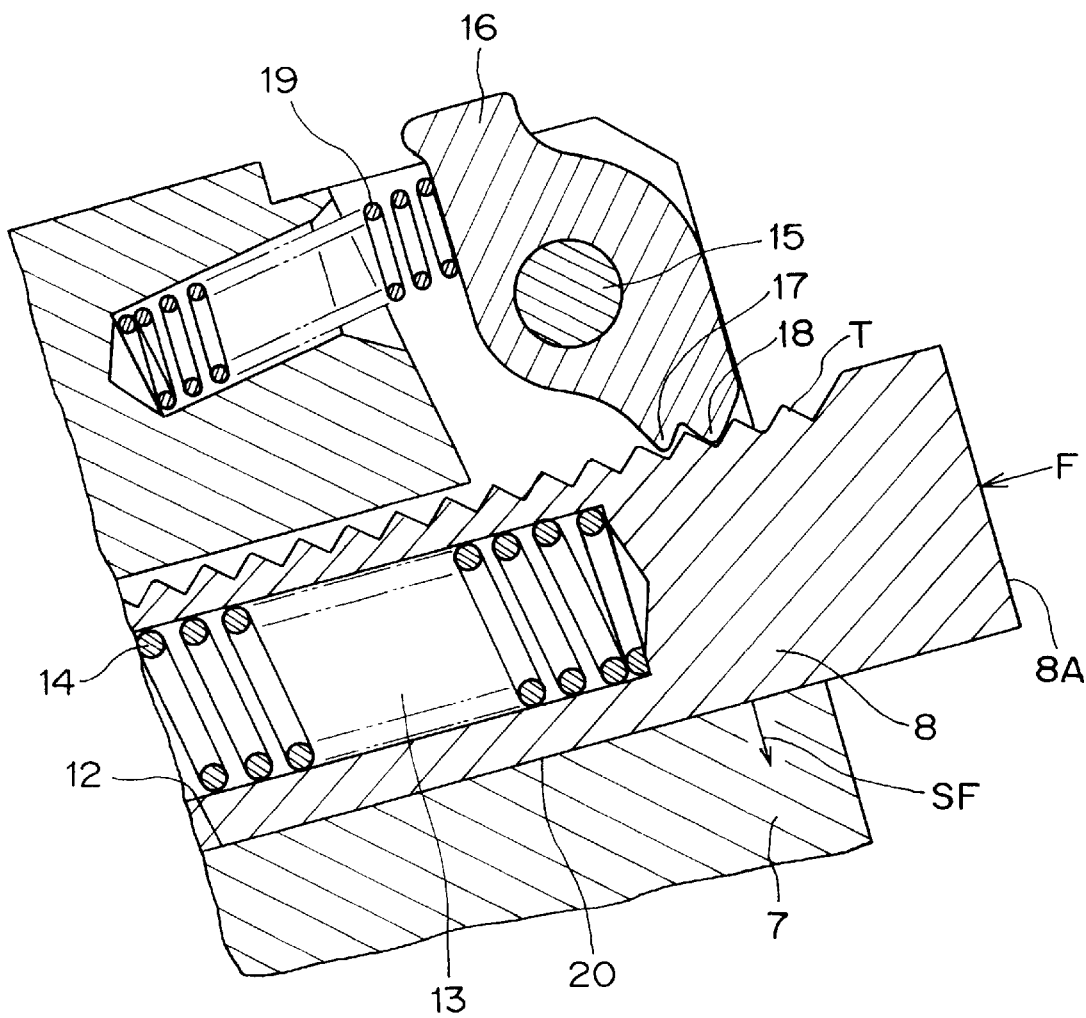
FIG. 2 is an enlarged sectional view of a front end portion of the plunger of FIG. 1.

A ratchet 16 is pivotally supported on the tensioner housing 7 by means of a ratchet pin 15. As shown in FIG. 2, the ratchet 16 has ratchet pawls 17 and 18 which mesh with rack teeth T formed on an outer surface of the plunger 8.

A ratchet spring 19, which is disposed between the tensioner housing 7 and the ratchet 16, urges the ratchet 16 to rotate about the ratchet pin 15 so that the ratchet pawls 17 and 18 are in engagement with the rack teeth T at all times. Through engagement between the ratchet pawls 17 and 18 and the rack teeth T, the plunger 8 is prevented from moving in a receding direction (to the left in FIG. 2).

Figure 3:
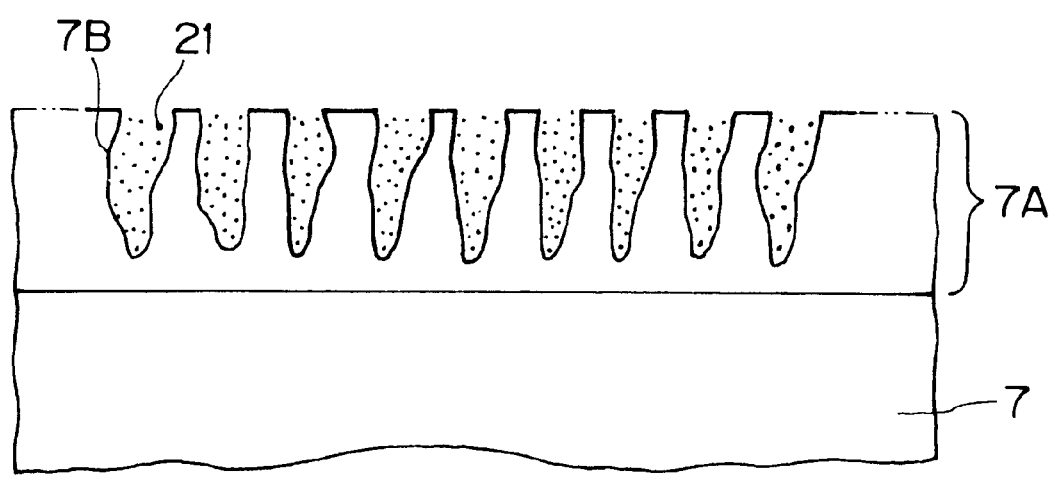
FIG. 3 is an enlarged sectional view of an alumite layer.

The tensioner housing 7 is formed of an aluminum-containing metallic material. Subsequently, the tensioner housing 7 is subjected to hard anodizing, so that a hard alumite layer 7A (FIG. 3) is produced as a coating. Further, the tensioner housing 7 is subjected to a secondary electrolytic process in a solution containing ammonium tetrathiomolybdate, so that molybdenum disulfide 21 is held in fine pores 7B in the alumite layer 7A. Thus, the alumite layer 7A formed on the inner circumferential surface of the plunger accommodation bore 12 of the tensioner plunger 7 is smoothed. The thickness of the hard alumite layer 7A containing molybdenum disulfide 21 is set to 5 to 50 $\mu$m due to the following reasons. When the thickness of the hard alumite layer 7A is set equal to or less than 5 $\mu$m, the lubricant effect of the alumite layer 7A is not maintained for a sufficient period of time, and the strength of the alumite layer 7A decreases. When the thickness of the hard alumite layer 7A is set equal to or greater than 50 $\mu$m, the inner diameter of the plunger accommodation bore 12 becomes difficult to control. Preferably, the thickness of the hard alumite layer 7A is set to fall within the range of 5 to 30 $\mu$m. The above-described process for forming an alumite layer containing molybdenum disulfide is performed such that the hard alumite layer 7A is formed on at least the inner circumferential surface of the plunger accommodation bore 12 of the tensioner housing 7. However, the process may be performed such that the entire tensioner housing is coated with the hard alumite layer 7A.

In another embodiment, after the tensioner housing 7 formed of an aluminum-containing metallic material is subjected to hard anodizing, so that a hard alumite layer 7A is produced as a coating on the inner circumferential surface of the plunger accommodation bore 12 of the tensioner housing 7, a fluororesin is applied on the hard alumite layer 7A such that the fluororesin is held within the hard alumite layer 7A as a lubricant. In this case, a layer of the fluororesin may be further formed on the inner surface of the hard alumite layer 7A.

A comparison test was performed in order to compare a conventional tensioner housing formed of gray cast iron, a tensioner housing formed of an aluminum alloy, and two types of tensioner housings according to the present invention. In the tensioner housings of the first and second types according to the present invention, the tensioner housing 7 was formed of an aluminum-containing metallic material, and a hard alumite layer was formed on the inner circumferential surface of the plunger accommodation bore 12. Further, in the tensioner housing of the first type according to the present invention, the hard alumite layer contained therein molybdenum disulfide serving as a lubricant, and in the tensioner housing of the second type according to the present invention, the hard alumite layer contained therein a fluororesin serving as a lubricant. FIG. 4 shows the results of the comparison test.

The comparison test was performed as follows. Each of the tensioners was assembled in the same state as that employed in actual use, as shown in FIG. 2, while a plunger formed of a hardened steel was used. By use of a vibrator, a cyclic load F of 0–200 Kg (see FIG. 2) was applied to the tip end 8A of the plunger 8 fitted into the plunger accommodation bore 12 of the tensioner housing 7 under a plunger stroke of 0.1 mm and a frequency of 100 Hz. The life before occurrence of seizure was measured.

In the test, the tensioners of each type according to the present invention included a tensioner in which the lubricant-carrying hard alumite layer had a thickness of 7 $\mu$m, a tensioner in which the lubricant-carrying hard alumite layer had a thickness of 17 $\mu$m, a tensioner in which the lubricant-carrying hard alumite layer had a thickness of 30 $\mu$m, and a tensioner in which the lubricant-carrying hard alumite layer had a thickness of 40 $\mu$m.

The test results demonstrate that even after elapse of 1000 hours, seizure did not occur in the tensioner housing of the present invention in which a hard alumite layer (7 $\mu$m, 17 $\mu$m, 30 $\mu$m, or 40 $\mu$m) containing molybdenum disulfide or a fluororesin was formed on the inner circumferential surface of the plunger accommodation bore, but seizure occurred within about 500 hours in the conventional tensioner housing of gray cast iron and within about 100 hours in the tensioner housing formed of an aluminum alloy.

As can been seen from the test results, the tensioner housing of the present invention in which a hard alumite layer containing molybdenum disulfide or a fluororesin was formed on the inner circumferential surface of the plunger accommodation bore has a longer service life before occurrence of seizure as compared with the conventional housing formed of gray cast iron and the housing formed of an aluminum alloy.

Obviously, numerous modifications and variations of the present invention are possible in light of the above teachings. It is therefore to be understood that within the scope of the appended claims, the present invention may be practiced otherwise than as specifically described herein.

What is claimed is:

1. A ratchet tensioner, comprising:

a tensioner housing having a plunger accommodation bore formed therein;

a plunger having an outer circumferential surface slidably fitted into said plunger accommodation bore of said tensioner housing and urged by a spring such that a tip portion of said plunger is projected to the exterior of said plunger accommodation bore; and a ratchet pivotally supported on a ratchet pin provided on said tensioner housing;

said tensioner being configured such that a ratchet pawl formed on said ratchet is in mesh with rack teeth formed on an outer surface of said plunger so as to prevent said plunger from receding into said plunger accommodation bore; wherein said plunger accommodation bore of said tensioner housing has an inner circumferential surface formed of an aluminum containing metallic material for direct sliding contact with said outer circumferential surface;

a hard alumite layer having a thickness of 5 to 50 $\mu$m is formed on said inner surface of said plunger accommodation bore; and a lubricant is held within said alumite layer, and is adapted to lubricate said sliding contact.

2. A ratchet tensioner according to claim 1, wherein the thickness of said hard alumite layer is in the range of 5 to 30 $\mu$m.

3. A ratchet tensioner according to claim 1, wherein said tensioner housing is formed of aluminum.

4. A ratchet tensioner according to claim 1, wherein said tensioner housing is formed of an aluminum alloy.

5. A ratchet tensioner according to claim 3, wherein said lubricant is molybdenum disulfide.

6. A ratchet tensioner according to claim 3, wherein said lubricant is a fluororesin.

7. A ratchet tensioner according to claim 6, wherein said lubricant is molybdenum disulfide.

8. A ratchet tensioner according to claim 6, wherein said lubricant is a fluororesin.

* * * * *